United States Patent [19]

Tiemann

[11] Patent Number: 4,896,152
[45] Date of Patent: Jan. 23, 1990

[54] TELEMETRY SYSTEM WITH A SENDING STATION USING RECURSIVE FILTER FOR BANDWIDTH LIMITING

[75] Inventor: Jerome J. Tiemann, Schenectady, N.Y.

[73] Assignee: General Electric Company, Schenectady, N.Y.

[21] Appl. No.: 318,097

[22] Filed: Mar. 2, 1989

[51] Int. Cl.[4] .............................................. G10L 5/00
[52] U.S. Cl. ...................................... 340/853; 367/81; 340/870.01; 340/850; 375/122; 375/60; 375/75; 375/96
[58] Field of Search ...................... 340/850, 853, 870.1, 340/870.16; 367/81; 375/122, 59, 60, 75, 96, 103

[56] References Cited

U.S. PATENT DOCUMENTS

| 4,386,430 | 5/1983 | Treiber | 375/103 |
| 4,682,343 | 7/1987 | Pfiffner | 375/59 |
| 4,733,403 | 3/1988 | Simone | 375/103 |
| 4,802,222 | 1/1989 | Weaver | 375/122 |
| 4,819,252 | 4/1989 | Christopher | 375/122 |

Primary Examiner—Harold J. Tudor
Assistant Examiner—J. Woodrow Eldred
Attorney, Agent, or Firm—Allen L. Limberg; James C. Davis, Jr.; Marvin Snyder

[57] ABSTRACT

Before subsampling them for transmission, telemetry data are bandwidth-limited by IIR filtering at the sending station of a telemetry system. The transmitted filtered telemetry data have attendant phase distortion that is compensated for by FIR filtering at the receiving station of the system, so as to obtain overall linear phase response through the system.

8 Claims, 4 Drawing Sheets

TELEMETRY SYSTEM WITH A SENDING STATION USING RECURSIVE FILTER FOR BANDWIDTH LIMITING

This invention was made with government support under contract No. N66001-87-C-0482 awarded by the Department of Navy. The government has certain rights in this invention.

The present invention relates to telemetry systems and more particularly to systems where the designer finds it desirable to minimize digital hardware in a transmitting station of the system even at the expense of increased digital hardware in a receiving station of the system.

BACKGROUND OF THE INVENTION

This desire is felt when designing certain telemetry systems using wires, radio waves, light waves or other medium to link sending and receiving stations. This desire is felt, for example, where there is a much greater number of sending stations than receiving stations, owing to the overall savings of digital hardware that can then be made in the system.

However, in certain circumstances this desire may be felt irrespective of the relative numbers of sending and receiving stations in the telemetry system owing to the power, volume or weight restrictions imposed upon the sending station being more restrictive than ones for corresponding parameters impose upon the receiving station. Examples of this are where the sending station is in a missile, in a launch vehicle or in an artificial satellite of a planet.

In order to conserve telemetry bandwidth and possibly to reduce average power, it may be desirable to subsample the samples of a digital electric signal descriptive of a measured parameter. To avoid objectionable aliasing being introduced by such subsampling, it is the common practice to filter the digital signal prior to subsampling if the Nyquist rate to properly sample the signal exceeds the subsampling rate. After filtering, the subsampling rate exceeds the new Nyquist rate for the filtered signal, and the subsamples are transmitted to the sending station.

In some applications, phase distortions introduced by filters with non-linear phase responses tend undesirably to obscure features of the telemetry signal. In such cases, the filters used in prior art telemetry have been of finite-impulse-response (FIR) type in order to secure linear-phase filtering. FIR filters are non-recursive and tend to involve a larger amount of digital hardware than recursive filters—that is, filters of infinite-impulse-response (IIR) type. Extending the number of samples in the filter impulse response by recursion allows more abrupt cut-off to be obtained for the same computation load. Narrower passbands or stopbands can be realized recursively for a fixed amount of power or hardware complexity. A bandwidth limiting filter with sharper cut-off permits the filter response to be subsampled closer to Nyquist limit (i.e., less frequently) without incurring aliasing.

Recursive filters accumulate samples, adding each new sample as weighted by a respective factor less than unity, to an accumulation of past weighted samples, which permits their structures to be relatively simple while their impulse response is long-extended. Usually only a single multiplier is used for each accumulation procedure, and each procedure generates an impulse response of extended duration in terms of number of samples. This extended impulse response is obtained through short term storage of accumulation results. There is no need for extensive delay network and a large number of multipliers to obtain such extended duration of response as would be the case in an FIR filter. The simpler IIR filter structures tend to use less power and have less volume and weight than FIR filter structures when impulse responses are required over a large number of sample intervals.

However, the distortion in phase attendant with the use of IIR filters has led engineers away from using recursive pre-filters for subsampling telemetric data. Correction of these phase distortions at the sending station has been done, but the attendant increase in the amount of filtering at the sending station also increases the complexity of the overall filter. In any case, the desire for maximization of complexity and power at the sending station is not achieved.

SUMMARY OF THE INVENTION

A telemetry system embodying the invention uses a sending station wherein digital signal samples responsive to a measured parameter—i.e., descriptive of telemetry data—are applied to a recursive filter for limiting the bandwidth of the signal preparatory to subsampling, thereby to avoid substantial aliasing. These subsamples are then supplied to a transmitter for transmitting information via a medium to a receiving station. The recursive filter has a system function with poles (and perhaps zeroes) in the complex frequency domain which introduce undesirable phase distortion into the telemetry data. The telemetry data is transmitted together with attendant phase distortion.

The undesirable phase distortion is compensated for in a receiving station of the telemetry system, which station has a receiver therein for recovering a replica of the subsampled filter response. The replica is resampled at the original sampling rate with the sample positions empty of subsamples being filled with zero values. The compensation is provided for by filtering the resampled replica with a further filter having a low-pass system function, for suppressing repeats introduced by resampling, which system function includes zeroes located at the same place in the Z transform domain as the poles of the system function of the recursive filter in the sending station. Any zeros introduced at the transmitter are left alone, so these become part of the overall response.

DETAILED DESCRIPTION

Figure 1:
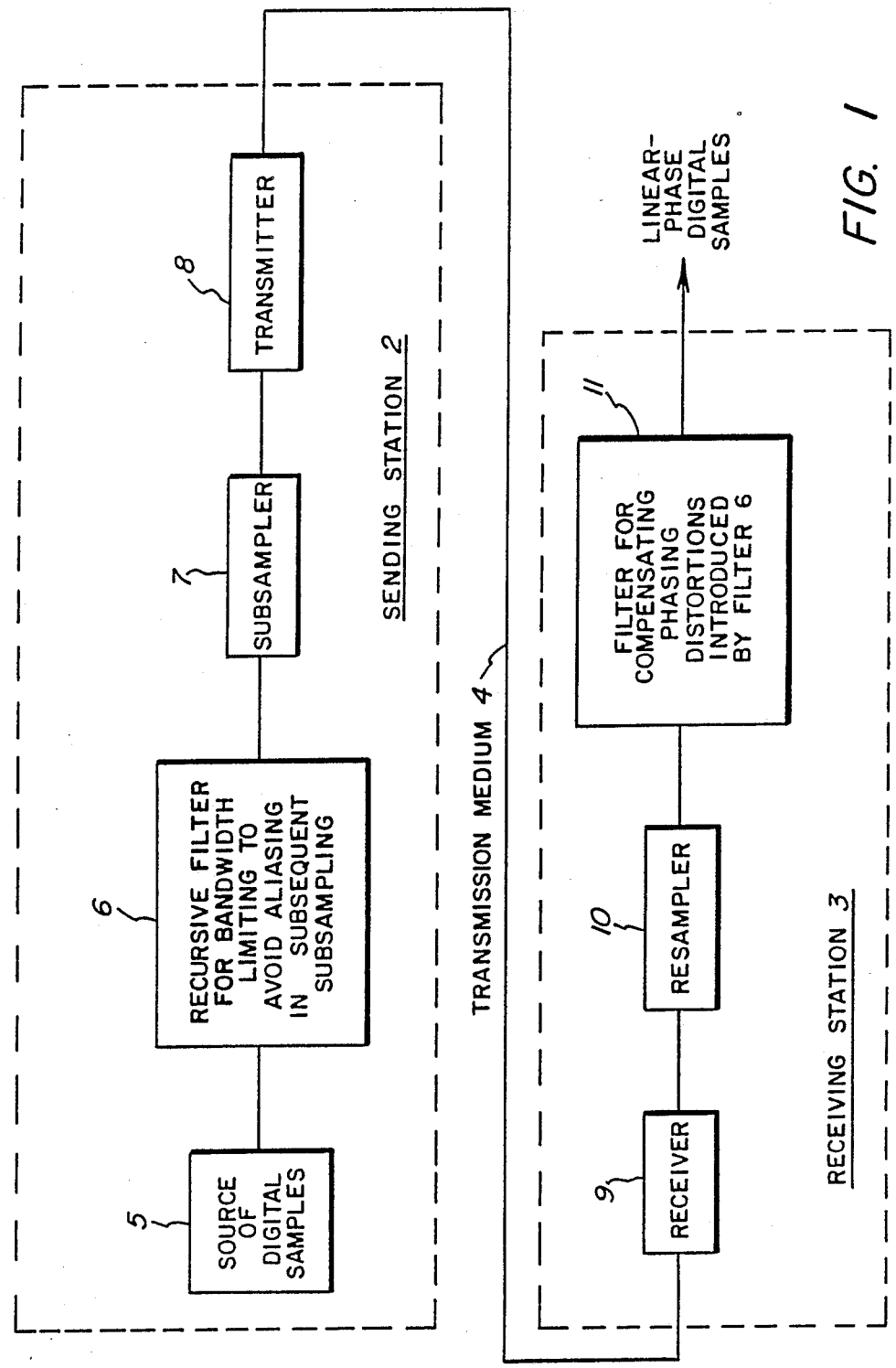
FIG. 1 is a schematic diagram of a telemetry system in which the invention in various of its aspects is embodied.

The FIG. 1 telemetry system comprises a sending station 2, a receiving station 3 and a transmission medium 4 linking them. Sending station 2 includes a source of digital samples of the telemetry data that describes the measured parameter, as obtained from a sensor, for example. A recursive IIR digital filter 6 limits the bandwidth of these samples so that the sample frequency spectrum and its repeats generated by subsequent subsampling or decimation in a subsampler 7 will not intermingle to any appreciable degree, so as to avoid aliasing. The subsamples from subsampler 7 are supplied to a transmitter 8 appropriate to the transmission medium 4 being used—e.g., wires, radio transmission through an ether, or light transmission. At the receiving station 3 a receiver 9, of a type appropriate to the transmission medium 4 and to transmitter 8, recovers a replica of the subsampled filtered telemetry data supplied to transmitter 8. This replica exhibits phase distortion owing to the non-linear phase characteristics of the sending station filter 6. These non-linear phase characteristics are attributable to that filter 6 being recursive in nature, so that the filter kernel perforce is asymmetric. To suppress by means of compensation this phase distortion, the replica of the subsampled filtered telemetry data is subjected to filtering after receiver 9.

It is more convenient to consider such filtering as being done after resampling the replica to the original sample rate of the digital signals, using re-sampler or expander 10 after receiver 9. Resampling is a procedure for generating from a set of original samples a new set of samples at a different sampling rate, each new sample being generated by an appropriate weighting of closeby samples in the old set. The accepted procedure for doing expanding, or resampling to higher sampling rate, on an interpolative basis is to place the samples preserved during subsampling in their previous cyclic order; to insert zero samples in cyclic order where the original samples have not been preserved during subsampling, which insertion generates repeat frequency spectra offset by respective multiples of sampling frequency. Re-sampler 10 is followed by a filter 11 to suppress the repeat frequency spectra by appropriate band-limit filtering and for compensating unwanted phase distortions introduced by filter 6. To further this goal, filter 11 has zeros in its system function located at corresponding points in the Z transform domain as the poles in the system function of the recursive filter 6 as well as zeros that suppress the repeat frequency spectra.

Filter 11 is not a complementary filter with respect to the cascade connection of recursive filter 6 and subsampler 7, however. That is, it is not a filter which has a system function that when connected with the system functions of recursive filter 6 and of subsampler 7 results in flat response over all frequencies. Recursive filter 6, being a bandwidth-limiting filter for avoiding aliasing, provides relatively large attenuation in the portions of its stopband next to the skirt of its frequency response in order to perform its assigned duty, and concomitant phase distortion is great for these skirt frequencies and portions of the passband near them. So a complementary filter would have to provide relatively large gain at certain frequencies to compensate for the relatively large attenuation afforded them by recursive filter 6 and relatively miniscule gain at certain other frequencies to compensate for the relatively small attenuation afforded them by recursive filter 6. This requires substantially greater precision in the sampling and filtering procedures at sending station 2 and in the filtering procedure at receiving station 3 because the complementary filter response to quantizing noise is so exaggerated in the skirt-frequency regions. This increased need for precision is incompatible with the desire to reduce the complexity of digital hardware at sending station 2. The increased need for precision also makes it necessary to increase the number of significant taps and the range of tap weights in a complementary filter, which procedures one desires to avoid, if possible. Further, the region of high gain through the complementary filter extends over the region where the signal frequency spectrum and repeat spectra skirts extend and tend to intermingle to cause undesirable aliasing. Accordingly, there tends to be a stronger requirement for skirt suppression imposed on the recursive filter 6, which also is incompatible with the desire for simpler filtering hardware at sending station 2.

Instead, filter 11 is a bandwidth-limiting filter with a passband somewhat narrower or at least not appreciably broader than that of the recursive filter. Such a filter suppresses the repeat spectra generated by zero re-insertion in re-sampler 10, so re-sampler 10 itself need not include filtering for that purpose and may, for ease of analysis, simply consist of means for inserting zero-value samples in appropriate sample positions. The fact that all sample positions except every $n^{th}$ in the output signal of re-sampler 10 are zero-valued, when filtering is exclusively in filter 11, means filter 11 may be considered as being an interpolative filter. Design procedures for interpolative filters have been studied extensively in the prior art, particularly in connection with quadrature mirror filtering, and are usefully applied to filter 11.

To obtain a more specific feeling of what type of filter might be used for filter 11, consider a filter having a system function that is the system function of the previously considered complementary filter, as convolved with the system function of a linear-phase window filter having appreciable attenuation in the frequency regions where repose the skirts of the recursive filter 6. Preferably the bandwidth of the window filter should be narrower than that of recursive filter 6, thus to cause the bandwidth of filter 11 to be somewhat narrower than that of recursive filter 6 (and incidentally provide for the suppression of repeats introduced by insertion of zero-value samples in re-sampler 10). Such a filter 11 does not exhibit so great a range in the amplitudes of its filter coefficients as a complementary filter, and the exaggeration of quantization noise effects at passband edges is not incurred. The range of tap weights in filter 11 and the number of significant taps are not higher than the norm for low-pass digital filters. Customary precisions of twelve to sixteen bits in the multiplications involved in the filters 6 and 11 appear to be sufficient, the inventor has calculated by computer simulation.

These calculations were made assuming a subsampler 7 that selected every third sample in a baseband. To avoid aliasing in the subsequent 3:1 subsampling a nine-pole Chebyshev low-pass filter with cut-off frequency at 0.12 sample rate, with attenuation of about 48 dB at 0.17 sample rate and with zeroes at sample rate was selected for modification to provide recursive filter 6. The modifications made in the filter were replacing the numerator of the system function with unity and adjusting filter sensitivity to maintain attenuation across band and remove the hump in response in the higher frequency portions of pass band. Both the amplitude variation and phase variations of such a filter through the passband and beyond are notoriously great. The filter 11 was designed convolving the complementary filter system function with the system function of a linear-phase low-pass filter.

This linear-phase low-pass filter system function was generated by the following procedures. An appropriate sinc function was convolved with a Gaussian window of sufficient narrowness of bandwidth to achieve stopband attenuation in excess of that afforded by the recursive filter 6. For convenience this symmetric filter kernel was truncated to 299 samples and, to decrease the likelihood of trunction error, was convolved with itself. The resulting low-pass filter with a 599-sample-wide kernel provided over 200 dB attenuation in a stopband.

Overall system response to an impulse in a system using the filters 6, 11 just described was noted to be symmetric with calculations both where twelve bits plus sign were preserved throughout calculations and where nine bits plus sign were preserved throughout calculations. An additional two bits or so resolution may be required in actual digital hardware implementations because of the customary practice of constructing the filters by sections.

A more general design procedure for telemetry systems embodying the invention employs Z transforms, as follows. An overall system function (H(Z)) should be factorable into factors $H_1(Z)$ and $H_2(Z)$, where $H_1(Z)$ consists of the product of unity times each zero of filter 6, and where $H_2(Z)$ consists of the product of unity times each zero of filter 11. One determines G(Z), the product of unity times each pole desired in filter 6, to go with the zeroes in $H_1(Z)$ in order to provide a $H_1(Z)/G(Z)$ system function that affords appropriate band-limiting for the subsequent subsampling. This can be done with reference to filter tables or by using an appropriate computer program for filter design. The system function for filter 11 will then be $H_2(Z) G(Z)$, which is not linear-phase, but is FIR owing to the absence of poles. Filters 6 and 11 are cascaded insofar as overall system function is concerned, so overall system function is the product of their respective system functions $H_1(Z)/G(Z)$ and $H_2(Z) G(Z)$—i.e., $H_1(Z)H_2(Z)$ which equals the originally specified H(Z). Known synthesis procedures can now be applied for designing filters with the desired system functions.

The filter 6 may include zeroes for a number of different reasons. For example, zeroes may be included to reduce the number of poles required to obtain desired cut-off characteristics in filter 6. Use of an elliptic filter design would be a case in point. Or, for example, zeroes may be included to implement subsampling which does not simply select every $n^{th}$ sample of an IIR response, but instead selects every $n^{th}$ one of a linear-phase (and thus FIR) weighted average of $2n+1$ successive samples of IIR filter response. More particularly, the IIR response may be convolved with a triangularly weighted interpolation function, to make filter amplitude response that has less high-frequency quantizing noise.

Figure 2:
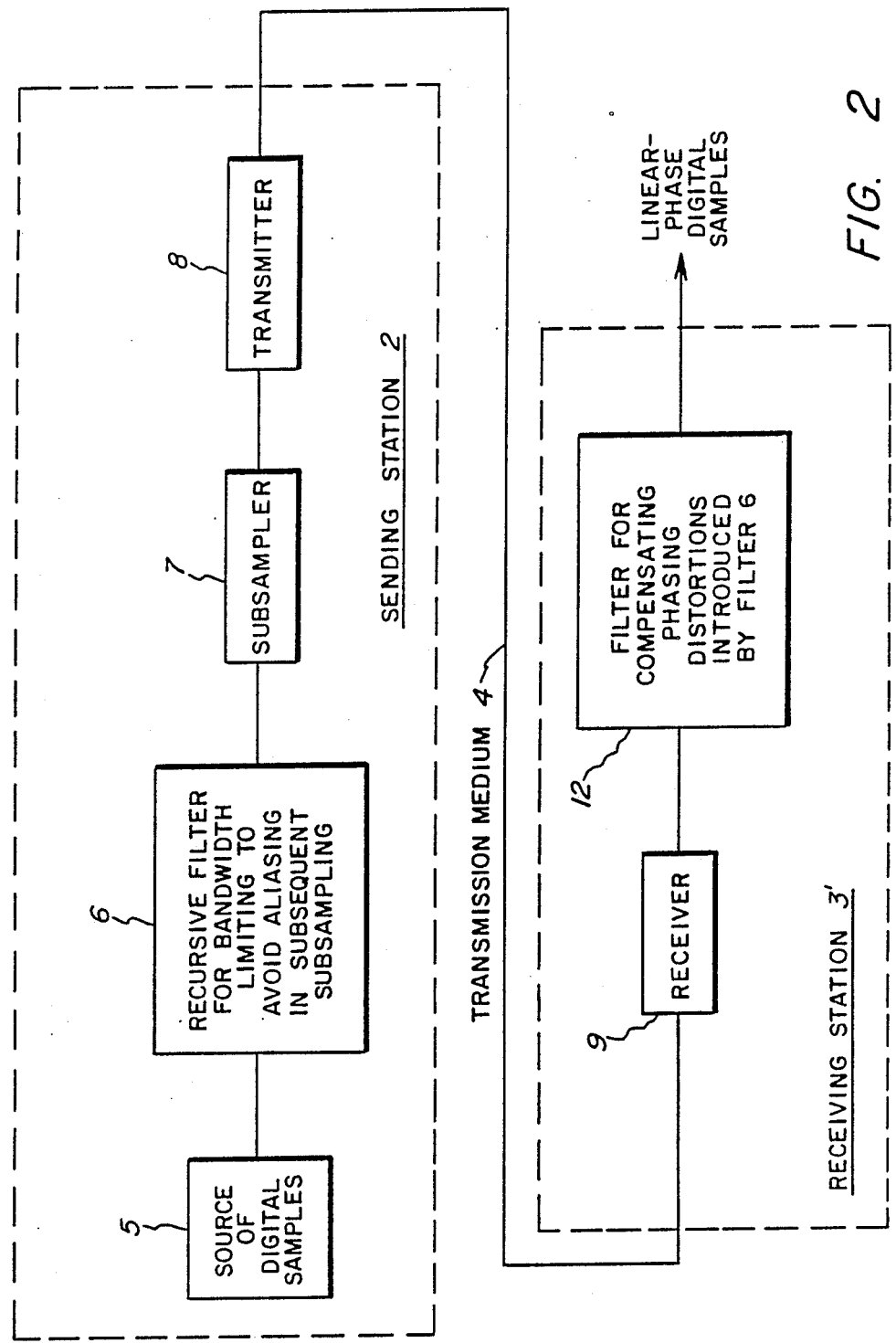
FIG. 2 is a schematic diagram of another telemetry system in which the invention in various of its aspects is embodied.

FIG. 2 shows an alternative telemetry system configuration that can sometimes be used in place of the FIG. 1 telemetry system. The receiving station 3' of FIG. 3 differs from receiving station 3 of FIG. 1 in that the filtering after receiver 9 is not interpolative in nature. The subsampled telemetry data recovered by receiver 9 is limited in bandwidth and interpolative filtering does not increase the bandwidth of the telemetry data per se, of course. In the FIG. 2 telemetry system the digital filter 12 is operated at the subsampling rate, rather than at the original sampling rate, which subsampling rate is selected in the design of sending station 2 to be sufficient to sample the limited-bandwidth telemetry data in excess of Nyquist rate. The question of significance is whether the filter design at subsampling rate can afford adequate compensation of the phase distortion introduced by the poles in filter 6. The general nature of the technique involved in answering this question is easier to understand for the case where bandwidth limiting is low-pass in nature (although extension can be made to band-pass filtering). In describing this technique by subsampling example, rate is chosen one quarter the original sampling rate because the graphic illustrations of frequency scaling of the Z transforms are easier to verify by eye.

The Z transform allows sampled-data functions to be mapped onto a unit circle in a complex coordinate space in a way that conformally maps the way continuous functions in the complex-frequency domain are mapped onto the real axis of a complex-coordinate space using the Laplace transform. In FIGS. 3, 4, 5 and 6 the Z transform is used in such mapping.

Figure 3:
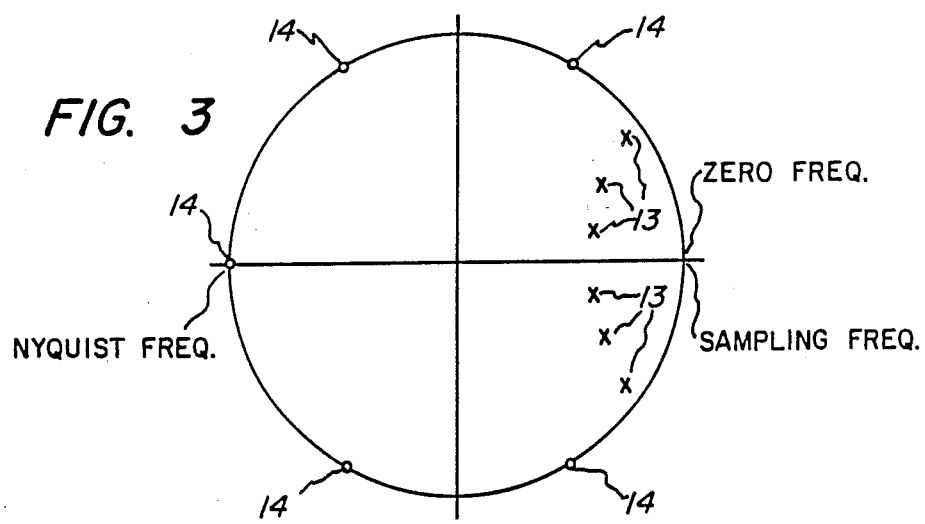
FIG. 3 is a diagram showing the location in a fully sampled Z transform complex-frequency domain of poles and zeroes of a representative recursive filter for use in the telemetry sending station of FIG. 1 or FIG. 2.

FIG. 3 shows the location of the poles 13 and zeroes 14 of a representative filter 6 (of elliptic low-pass type) in the Z transform domain for the original sampling rate. The locations of the poles 13 are denoted by X's and the locations of the zeroes 14 are denoted by 0's. The zeroes 14 are located on the unit circle. Zeroes located on the unit circle are known by those skilled in the art of filter design not to introduce departure from linearity of phase. Pairs of zeroes having like angular components and having radial components exhibiting like percentage differential from unit circle also are known by those skilled in the art of filter design not to introduce departure from linearity of phase. Other zero locations are known to introduce departures from linearity of phase in the filter characteristic.

Figure 4:
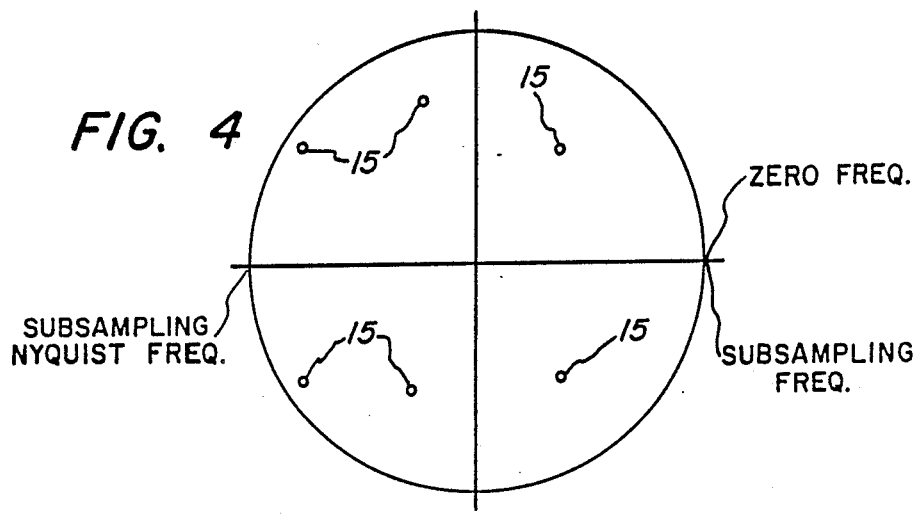
FIG. 4 is a diagram showing the location in a subsampled Z transform complex-frequency domain of pole-compensating zeroes of a representative non-interpolative finite-impulse-response filter for use in a telemetry receiving station as shown in FIG. 2.

FIG. 4 shows the locations of the pole-compensating zeroes 15 of a non-interpolative filter 12 in the Z transform domain for a subsampling rate one-quarter the original sampling rate. Each quadrant of the FIG. 3 bilinear transform domain at original sampling rate—i.e., the one from zero frequency to half Nyquist rate, the one from half Nyquist rate to Nyquist rate, the one from Nyquist rate to three-halves Nyquist rate, and the one from three-halves Nyquist rate to sampling rate—conformally maps to the bilinear transform domain at subsampling rate, with radial components of the Z transform vector preserved and with angular commponents multiplied by the ratio of original sampling rate to subsampling rate. The locations in the FIG. 4 Z transform domain for pole-compensating zeroes 15 of the non-interpolative FIR filter 12 correspond to the poles 13 of recursive filter 6 as subjected to frequency scaling. The radial component of each pole-compensating zero 15 of filter 12 is the same as that of a corresponding pole 13 of filter 6, but the angular component of each zero 15 of filter 12 is four times that of the corresponding pole 13 of filter 6. That is, the angular component is multiplied by the ratio of original sampling rate to subsampling rate. One notes the pole-compensating zeroes 15 are not located at the unit circle; that is, filter 12 is not linear-phase.

Figure 5:
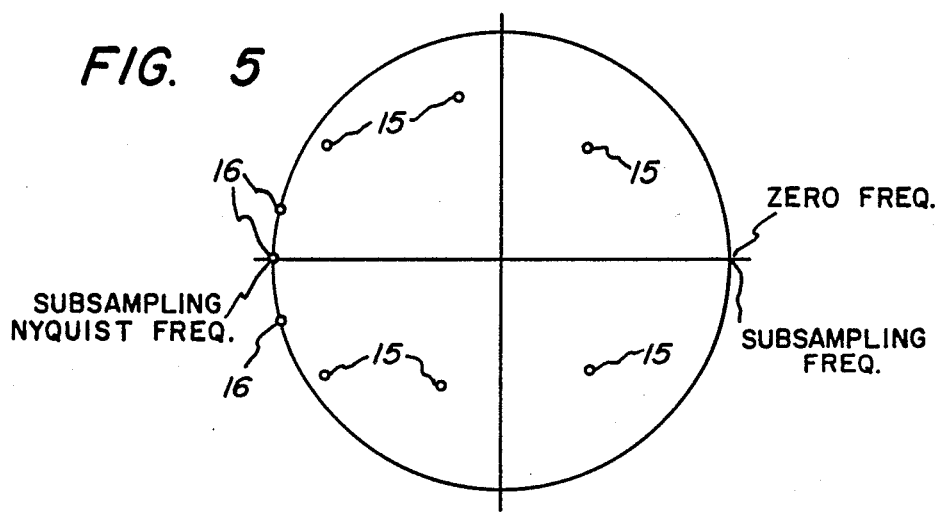
FIG. 5 is a diagram showing the location in the subsampled Z transform domain of all the zeroes of that representative FIR filter.

FIG. 5 shows the location of all zeroes of filter 12. In addition to the pole-compensating zeroes 15 of FIG. 4 there are additional zeroes 16 in stopband of filter 12, which are on the unit circle. These zeroes 16 are those which define a linear-phase low-pass filter function that is convolved with the pole-compensating filter function.

Figure 6:
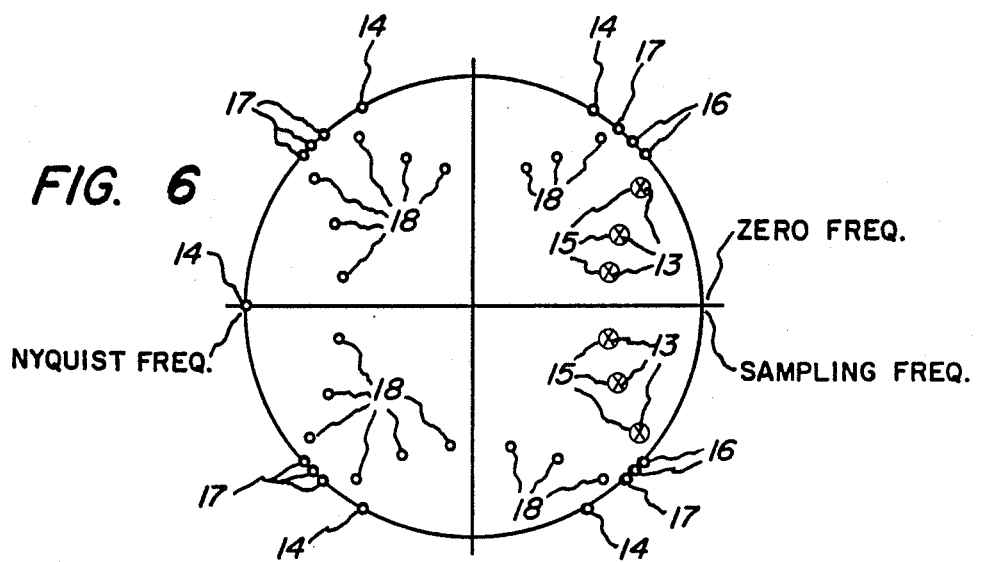
FIG. 6 is a diagram of a representative overall system response in the fully sampled Z transform domain, for the FIG. 2 telemetry system using filters of the type diagrammed in FIGS. 3–5.

FIG. 6 shows the overall system function response in the Z transform domain at original sampling rate. The poles 13 of the overall system function are those of filter 6 and they are overlain with respective ones of the pole-compensating zeroes 15 of filter 12, as transformed by frequency scaling. A pole and a correspondingly located zero are known to those skilled in the art of filter design to make no contribution to overall filter phase characteristic, and therefore they do not compromise linearity of phase of the overall filter. The zeroes 15 of filter 6 are located so as not to introduce non-linearity of phasing, as noted previously, and so are the zeroes 16 of filter 12 not used for pole compensation and their repeats 17.

The possibility for problem arises in the repeats 18 of the pole-compensating zeroes of filter 12 as they appear in the Z transform domain at original sampling rate. These repeats 18 are around half Nyquist rate, Nyquist rate and three-halves Nyquist rate points on the unit circle. These repeats are generated by the necessity to traverse four complete revolutions of the Z trasform domain at subsampling rate to map conformally one complete revolution of the Z transform domain at original sampling rate. The repeats 18 of pole-compensating zeroes lie off the unit circle and tend to introduce non-linearity of phase response, increasingly so as their frequency ranges are approached. This is a problem to the extent that there is still appreciable amplitude response in the overall system function in the skirt regions near one-quarter Nyquist rate and seven-quarters Nyquist rate, approaching the regions where the pole-compensating zeroes without corresponding poles lie. If the zeroes 14 of filter 6 and if the zeroes 16 of filter 12 and their repeats 19 reduce amplitude response sufficiently in these skirt regions, the effects of phase distortion from zero repeats 18 will not be an appreciable problem.

One can also arrange to reduce departure from linear phase response, as caused by the repeats 18 in the regions near half and three-halves Nyquist rate, by including zeroes in filter 6 which lie outside the unit circle. However, this tends to compromise the desire for simpler filtering at sending station 2.

The type of analysis incorporating frequency scaling which has been described in regard to non-interpolative low-pass filters in the receiving station can be extended to instances where there are non-interpolative band-pass filters in the receiving station to cooperate with band-pass recursive filters in the sending station in other embodiments of the invention. This type of analysis incorporating frequency scaling can also be extended to permit design of receiving stations in accordance with the invention which use a resampler 10, but resample to a sample rate that is higher than subsampling rate and that is not equal to original sampling rate.

When the interpolative filter 11 is used after a re-sampler 10 resampling to the original sampling rate in a telemetry system configured per FIG. 1, there are no repeats of pole-compensating zeroes in contrast with the telemetry system of FIG. 2 where filter 12 is a non-interpolative. Thus, one avoids the problems of the repeats of the pole-compensating zeroes being off the unit circle, so as to compromise phase linearity. The FIG. 1 embodiment of the invention, where resampling to original sampling rate is followed by interpolative filtering, provides essentially perfect pole compensation within the limits of resolution of the digital calculations.

While only certain preferred features of the invention have been illustrated and described herein, many modifications and changes will occur to those skilled in the art and acquainted with the foregoing disclosure. It is, therefore, to be understood that the appended claims are intended to cover all such modifications and changes as fall within the true spirit of the invention.

What is claimed is:

1. A telemetry sending station for generating information concerning the nature of a subsampled filtered digital electric signal to be received by a telemetry receiving station comprising a receiver for receiving from a medium said information generated by said telemetry sending station to recover a replica of said subsampled filtered digital signal and a finite-impulse-response filter of a type having a system function with zeroes for compensating phase distortion and further zeroes for limiting bandwidth on a linear-phase basis, said sending telemetry station comprising:

a source of samples of a digital signal response to a measured parameter;

a recursive filter having a transfer function having poles in the Z transform domain where the transfer function of said finite-impulse-filter has its zeroes for compensating phase distortion, said recursive filter for bandwidth limiting said digital signal to obtain a filtered digital signal;

means for subsampling the response of said recursive filter without substantial aliasing to obtain said subsampled filtered digital signal; and a transmitter for transmitting via said medium said information concerning the nature of a filtered digital signal as supplied from said means for subsampling.

2. A telemetry receiving station for receiving telemetry signals as generated by a first telemetry station comprising a source of samples of a digital signal responsive to a measured parameter, a recursive filter for limiting the bandwidth of said digital signal, means for subsampling the response of said recursive filter without incurring substantial aliasing; and a transmitter for transmitting via a medium beween said first and second telemetry stations information concerning the nature of the subsampled filtered digital signal, which recursive filter is of a type having a transfer function with at least poles and possibly zeroes that avoids aliasing during said subsampling, but which poles introduce unwanted distortions of phase into said subsampled filtered digital signal, said telemetry receiving station comprising:

a receiver for receiving from said transmission medium said information concerning the nature of the subsampled filtered digital signal to recover a replica thereof; and a finite-impulse-response filter responding to said replica for generating a response in which said unwanted distortions of phase are substantially reduced, said finite-impulse-response filter having a system function with zeroes in the Z transform domain at locations corresponding to the poles of said recursive filter.

3. A telemetry receiving station as set forth in claim 2 wherein said finite-impulse response filter is preceded by a resampler that tends to generate repeat spectra, and wherein said finite-impulse-response filter has further zeroes in its system function having the same location in the Z transform domain as the zeroes of a linear-phase bandwidth-limiting filter, for suppressing said repeat spectra.

4. A telemetry system for use with a transmission medium, said telemetry system comprising:
   a source of digital signal samples provided at a prescribed sampling rate, said samples descriptive of a measured parameter;
   a recursive filter for limiting the bandwidth of said digital signals, said filter having a system function with at least poles that avoids aliasing during subsequent subsampling but undesirably introduces unwanted distortions of phase into the filter output signal owing to said poles;
   means for subsampling said filter output signal without incurring substantial aliasing;
   a transmitter for transmitting information concerning the nature of said subsampled filter output signal via said transmission medium;
   a receiver for receiving information concerning the nature of said subsampled filter output signal from said transmission medium and generating a replica thereof; and
   a finite-impulse-reponse filter responding to said replica for generating a response in which said unwanted distortions of phase are substantially reduced.

5. A telemetry system as set forth in claim 4 wherein said finite-impulse-response filter is preceded by a resampler that generates repeat spectra.

6. A telemetry system as set forth in claim 5 wherein said finite-impulse-response filter has a system function as results from convolving the inverted system function of said recursive filter with a linear-phase band-limiting system function for suppressing said repeat spectra.

7. A telemetry system as set forth in claim 5 wherein said finite-impulse-response filter has zeroes at positions in the Z transform domain corresponding to the positions said recursive filter has poles; and wherein said finite-impulse-response filter has further zeroes defining a linear-phase band-limiting system function for suppressing said repeat spectra.

8. A telemetry system as set forth in claim 4 wherein said finite-impulse-response filter has zeroes at positions in the Z transform domain corresponding to positions said recursive filter has poles.

* * * * *